(12) United States Patent
Singh et al.

(10) Patent No.: US 11,669,509 B2
(45) Date of Patent: Jun. 6, 2023

(54) SYSTEM AND METHOD FOR ACHIEVING OPTIMAL CHANGE DATA CAPTURE (CDC) ON HADOOP

(71) Applicant: JPMorgan Chase Bank, N.A., New York, NY (US)

(72) Inventors: Jagmohan Singh, Coppell, TX (US); Bharaneedaran Saravanan, Irving, TX (US); Prasad V. Pondicherry, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 165 days.

(21) Appl. No.: 16/147,976

(22) Filed: Oct. 1, 2018

(65) Prior Publication Data

US 2019/0102419 A1 Apr. 4, 2019

Related U.S. Application Data

(60) Provisional application No. 62/565,490, filed on Sep. 29, 2017.

(51) Int. Cl.
*G06F 16/00* (2019.01)
*G06F 16/23* (2019.01)
*G06F 16/25* (2019.01)

(52) U.S. Cl.
CPC ...... *G06F 16/2358* (2019.01); *G06F 16/2365* (2019.01); *G06F 16/254* (2019.01)

(58) Field of Classification Search
CPC . G06F 16/2358; G06F 16/2365; G06F 16/254
See application file for complete search history.

(56) References Cited

U.S. PATENT DOCUMENTS

| | | | |
|---|---|---|---|
| 8,543,596 B1 | 9/2013 | Kostamaa | |
| 9,501,550 B2* | 11/2016 | Zhang | ................... G06F 16/283 |
| 9,626,411 B1 | 4/2017 | Chang | |
| 10,615,984 B1* | 4/2020 | Wang | ........................ H04L 9/14 |
| 2014/0040575 A1* | 2/2014 | Horn | ..................... G06F 3/0688 |
| | | | 711/162 |
| 2015/0248420 A1 | 9/2015 | Makkar | |
| 2016/0267132 A1 | 9/2016 | Castellanos | |
| 2016/0283890 A1* | 9/2016 | Diehl | .................. G06F 16/2474 |
| 2017/0154039 A1 | 6/2017 | Crawford | |
| 2017/0163677 A1* | 6/2017 | Gordon | ............... G06F 16/9535 |
| 2017/0286520 A1* | 10/2017 | Christian | .......... G06F 16/24532 |

* cited by examiner

*Primary Examiner* — Neveen Abel Jalil
*Assistant Examiner* — Paul Kim
(74) *Attorney, Agent, or Firm* — Greenblum & Bernstein, P.L.C.

(57) ABSTRACT

An embodiment of the present invention is directed to configuring optimal parallelism on Hadoop processes at specific processing points for improved performance and throughput. An embodiment of the present invention forces Hadoop into high parallelism independent of a HDFS file size. An embodiment of the present invention achieves an order of magnitude improvement in performance and data throughputs to meet the SLAs. An embodiment of the present invention provides a design pattern unique to distributed processing in Hadoop to accomplish the required data throughputs for the CDC process.

18 Claims, 6 Drawing Sheets

Parameter details for 'Layout'

Attributes:

| Attribute | Value |
|---|---|
| Type | Layout |
| Input | true |
| Required | true |
| Export to environment | false |
| Runtime only | false |
| Common | false |
| Location | Embedded |
| Interpretation | PDL |
| Overridable | true |

Description:

Value: ☑ Resolved value node61 node62 node63 node64 node65
node66 node67 node68 node69 node3 node4
node5 node6 node7 node8 node9 node10
node11 node12 node13 node14 node16
node17 node18 node19 node20 node21
node22 node23 node24 node25 node26
node27 node28 node30 node31 node32
node33 node34 node35 node36 node37
node38 node39 node40 node41 node42
node44 node45 node46 node47 node48
node49 node50 node51 node52 node53
node54 node55 node58 node59 node60

Figure 5

| Parameter details for 'Layout' | | | Description: | |
|---|---|---|---|---|
| Attributes: | | | | ⊗ |
| Attribute | Value | | | |
| Type | Layout | | | |
| Input | true | | | |
| Required | true | | Value: | ☑ Resolved value |
| Export to environment | false | | | |
| Runtime only | false | | Partitions: | |
| Common | false | | hdfs://node65/user/cdds-prod/abinitio/abworkdir, | |
| Location | Embedded | | hdfs://node66/user/cdds-prod/abinitio/abworkdir, | |
| Interpretation | same as | | hdfs://node67/user/cdds-prod/abinitio/abworkdir, | |
| Overridable | true | | hdfs://node68/user/cdds-prod/abinitio/abworkdir, | |
| | | | hdfs://node69/user/cdds-prod/abinitio/abworkdir, | |
| | | | hdfs://node3/user/cdds-prod/abinitio/abworkdir, | |
| | | | hdfs://node4/user/cdds-prod/abinitio/abworkdir, | |
| | | | hdfs://node5/user/cdds-prod/abinitio/abworkdir, | |
| | | | hdfs://node6/user/cdds-prod/abinitio/abworkdir, | |
| | | | hdfs://node7/user/cdds-prod/abinitio/abworkdir, | |

Figure 6

SYSTEM AND METHOD FOR ACHIEVING OPTIMAL CHANGE DATA CAPTURE (CDC) ON HADOOP

CROSS REFERENCE TO RELATED APPLICATIONS

This application claims priority to U.S. Provisional Application 62/565,490, filed Sep. 29, 2017, the contents of which are incorporated herein in its entirety.

FIELD OF THE INVENTION

The invention relates generally to a system and method for achieving optimal change data capture (CDC) on Hadoop.

BACKGROUND OF THE INVENTION

Change Data Capture (CDC) generally refers to a set of software design patterns used to determine and track the data that has changed so that action may be taken using the changed data. CDC solutions are applied to data warehouse environments that capture and preserve the data. CDC is a technique used in traditional data environments to minimize the volume of data transfer between the System of Record (SOR) and a data repository. With this technique, only change records (e.g., insert, update, and delete, etc.) are transmitted from the SOR to the data repository. It is the responsibility of the data repository to reconstruct the full data snapshot from the change records.

Hadoop is an open source software framework used for distributed storage and processing of big data. The core of Hadoop includes a storage component—Hadoop Distributed File System (HDFS)—which is a distributed, scalable, and portable file system written in Java for the Hadoop framework. A Hadoop cluster has nominally a single namenode plus a cluster of datanodes, where each datanode serves up blocks of data over the network using a block protocol specific to HDFS. Hadoop is built for big data analytics and insights. Hadoop is a highly scalable storage platform that is designed to process very large data sets across hundreds as well as thousands of computing nodes that operate in parallel.

When using default Hadoop configurations to process CDC data, very poor performance and throughput was attained causing missed SLAs. The number of data nodes to be involved in parallelism for CDC is constrained to file block size (e.g., delta file and previous day full file) defaulted by Hadoop.

These and other drawbacks exist.

SUMMARY OF THE INVENTION

According to one embodiment, the invention relates to a system that processes optimal change data capture (CDC) on a Hadoop cluster of data nodes. The system comprises: an application component that receives change data; a memory component that stores change data; and a computer server coupled to the application component and the memory, the computer server comprising a programmed computer processor configured to perform the steps of: receiving a change data capture file that represents change activity for a current time period with respect to the application component; receiving a previous full data snapshot file; applying a data quality check process on the change data capture file, using a forced parallelism configuration that applies processing on a full set of Hadoop data nodes; applying change data capture records, using the forced parallelism configuration that applies processing on the full set of Hadoop data nodes; and generating a full data output based on the change data capture records.

According to another embodiment, the invention relates to a method that processes optimal change data capture on a Hadoop cluster of data nodes. The method comprises the steps of: receiving a change data capture file that represents change activity for a current time period with respect to an application component; receiving a previous full data snapshot file; applying a data quality check process on the change data capture file, using a forced parallelism configuration that applies processing on a full set of Hadoop data nodes; applying change data capture records, using the forced parallelism configuration that applies processing on the full set of Hadoop data nodes; and generating a full data output based on the change data capture records.

The system may include a specially programmed computer system comprising one or more computer processors, interactive interfaces, electronic storage devices, and networks.

The computer implemented system, method and medium described herein provide unique advantages to entities, organizations and other users, according to various embodiments of the invention. The features of an embodiment of the present invention achieve improved performance and throughput by applying forced parallelism during critical steps in the change data capture process. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIGS. 5 and 6 illustrates exemplary screenshots, according to an embodiment of the present invention.

DETAILED DESCRIPTION OF THE PREFERRED EMBODIMENT(S)

Figure 1:
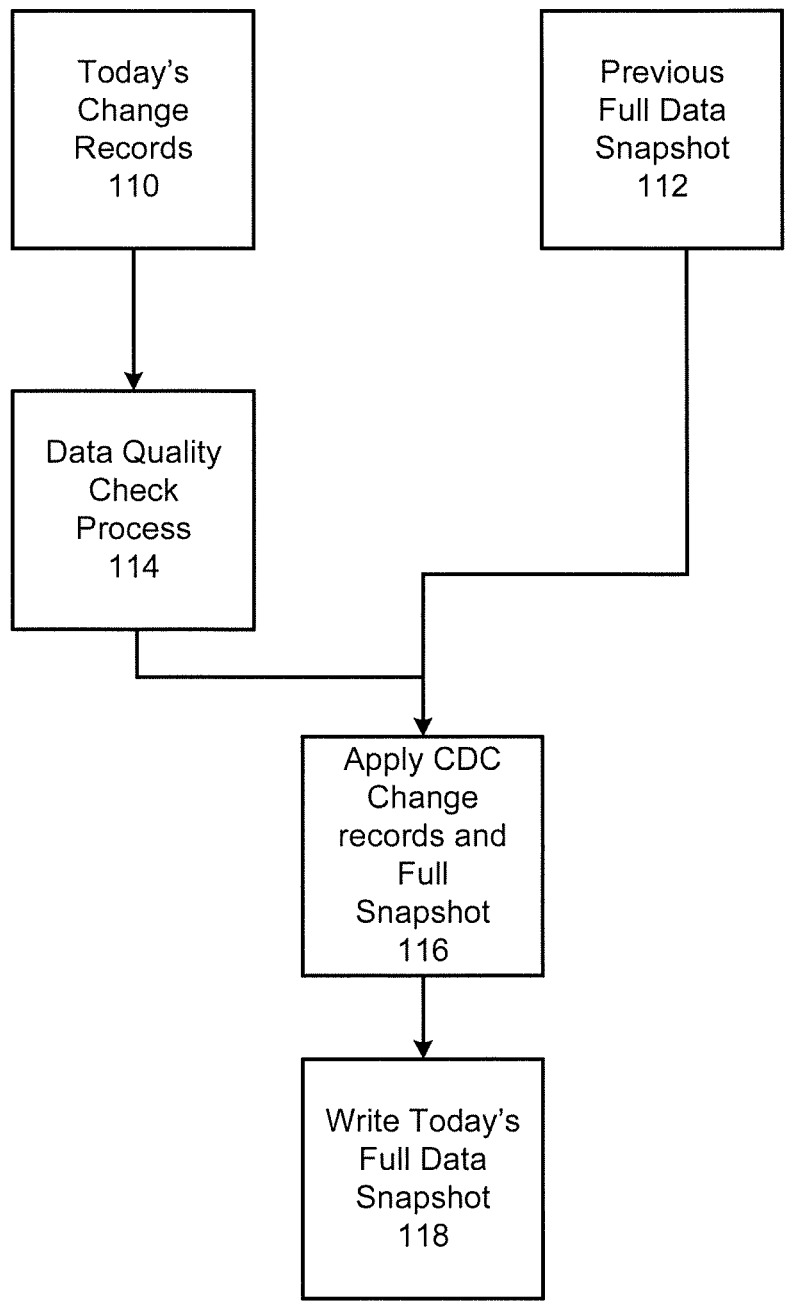
FIG. 1 is an exemplary system diagram of optimal change data capture (CDC) on Hadoop, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to improving a Change Data Capture process when updating Hadoop with change files from SORs. The innovative method and system changes and/or updates configuration settings in Hadoop to force Hadoop into high parallelism independent of the HDFS file size. An embodiment of the present invention is directed to configuring optimal parallelism on Hadoop processes at specific processing points for improved performance and throughput. An embodiment of the present invention achieves an order of magnitude improvement in performance and data throughputs to meet service level agreements (SLAs), for example.

An embodiment of the present invention provides a design pattern unique to distributed processing in Hadoop to accomplish optimal data throughputs for the CDC process. Entities providing data solutions may implement the approach of an embodiment of the present invention to achieve efficiencies using CDC on Hadoop.

For example, a source system may represent an application that interacts with various users. The application may be a website where a customer may enter data. The interaction data may be collected and then transmitted to a data warehouse for storage and analysis. In the example of a financial institution, the source application may include a website where customers may perform actions, e.g., check account balances, pay bills, change address, etc. For a given time period (e.g., a day), the financial institution may collect customer interaction data that relates to change action. In this example, the change action may involve an address change, password change, etc. Rather than sending data for all 60 million accounts, the system transmits a change file that captures data that relate to any changes, e.g., insert, update, delete, etc. For example, the change file may include 100 records that got updated, 75 records that were added and 50 records that were closed. At the data warehouse, using the change file, the system may then reconstruct the 60 million account snapshot.

Many entities store and manage data in big data architecture systems, such as Hadoop. Hadoop does not support traditional data warehousing processes. Hadoop is traditionally aligned with processing unstructured data and executing statistical analytics. Because Hadoop is specific to big data analytics and processes, Hadoop applies low parallelism to change files due to their file size. However, processes involving change files actually require high processing support. As a result, change data capture processes in Hadoop result in poor performance and bad throughput. An embodiment of the present invention applies forced high parallelism at strategic points in the process that resolve the performance and throughput issues with current systems.

FIG. 1 is an exemplary system diagram of optimal change data capture (CDC) on Hadoop, according to an embodiment of the present invention. As shown in FIG. 1, change records may be received at 110. A data quality check process may be performed at 114. Previous full data snapshots may be received at 112 where the system may then apply CDC change records and full snapshots at 116. The system may then write a full data snapshot at 118. An embodiment of the present invention recognizes processing points of forced high parallelism at steps 114 and 116. Processing points of default Hadoop parallelism are represented at steps 110, 112 and 118.

At step 114, data quality check process is specific to change records, which is a very small data set compared to the full data set. By default, Hadoop applies a very low parallelism to the change records due to the size of the file. The data quality check process requires intense CPU processing because it examines each and every attribute on the file and performs verification, such as whether the length of the record is proper, etc. By applying a forced high degree of parallelism at step 114, an embodiment of the present invention achieves increased performance.

At step 116, the system reads a previous day full snapshot and reconstructs a current day's activity with respect to the SOR and then generates a full file output. By default, Hadoop applies a very low parallelism to the change records due to the size of the file. However, this process requires high processing components to generate an entire output based on the change file. By applying a forced high degree of parallelism at steps 114 and 116, an embodiment of the present invention achieves increased and improved performance. The forced parallelism enables the system to distribute the processing to a full number of data nodes, as opposed to a small subset. According to another embodiment, the system may identify an optimal number of data nodes for processing based on the processing involved. In this example, the system may apply forced parallelism to utilize less than the full number of data nodes but more than the default number of nodes. Based on the type of processing involved or expected, the system may distribute processing in an optimal manner to achieve high performance and efficiency.

An embodiment of the present invention is directed to configuring optimal parallelism on Hadoop. Hadoop operates on cluster data nodes. For example, in production, there may be a hundred cluster data nodes. Based on the size of a file, Hadoop by default applies a degree of parallelism. Because CDC files, while small in size, require intense processing, Hadoop's default parallelism is insufficient and results in bottlenecks and poor performance. An embodiment of the present invention is directed to a specific configuration at strategic points to obtain optimal performance and processing for CDC files.

Figure 2:
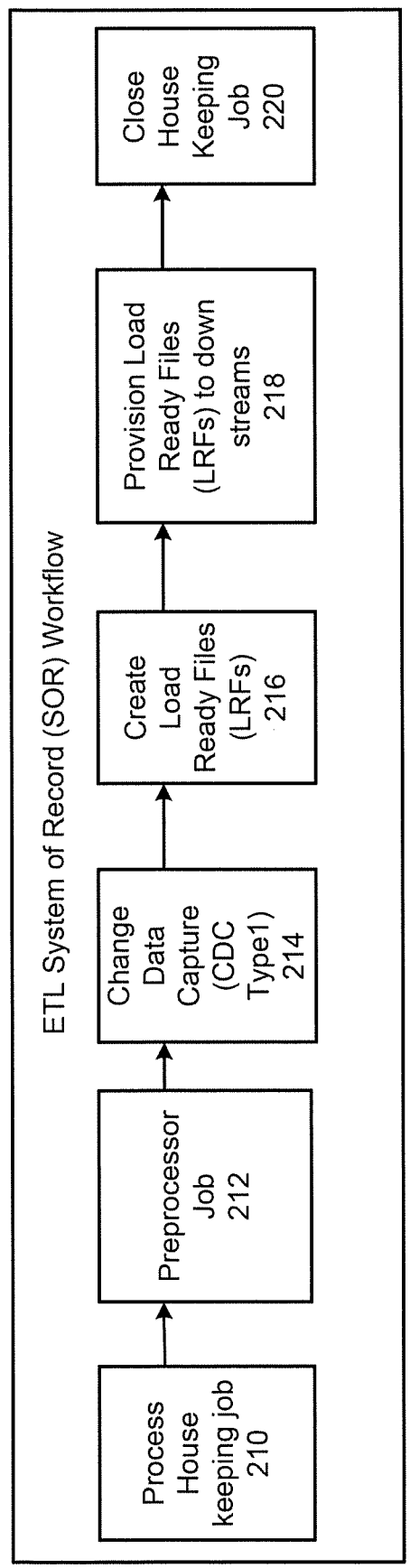
FIG. 2 is an exemplary flow diagram of an ETL system of record current workflow process.

FIG. 2 is an exemplary flow diagram of an ETL system of record current workflow process. FIG. 2 illustrates an overview of the ETL process flow from SOR files landing to target tables, such as a database platform where users consume data for various reporting needs.

At 210, Housekeeping jobs may be processed. Housekeeping (HK) job may be executed at a beginning of a process to open a calendar date (e.g., ODate or Business Date) for a particular day. Each HK job may have a corresponding Business Unit (BU) job at the end of processing for that particular date. The BU job closes the business day after processing is completed. BU job may represent a job which marks a completion of a current business day ETL processing for a particular SOR.

At 212, a Pre-processor job may take the received source SOR files and perform validations, including data check, metadata check etc. For example, this job ensures that the business_date for data received aligns with that of the control file hence making the process error free. Also, this job ingests the data into the Hadoop region.

At 214, Change Data Capture may be applied. Change Data Capture (CDC) represents a technique used in traditional data environments to minimize the volume of data transfer between the System of Record (SOR) and the data repository. CDC identifies the difference or changes (e.g., inserts, deletes, updates) in data received for a particular loan by comparing with previous day data already existing in the system.

At 216, Load Ready Files (LRFs) may be created to generate load ready files based on downstream requirement.

At 218, LRFs may be provisioned to a downstream consumption environment such as INFOPROD and database platforms.

At 220, HK job may close the calendar entry for the current date after the completion of staging process for the SOR.

According to an embodiment of the present invention, a SOR may send only change records through delta files and data warehouse platforms that need to perform CDC with previous day master file and create a current day master file. For example, there may be four exemplary types of scenarios in a typical CDC Type 1 Process. The four types of scenarios may include: Inserts, Updates, Unchanged and Purges. A Type 1 Process may create a current day master by CDC. In this example, the process may involve inserting new records that come in a current day into current day master file. The process may involve processing records which have updates in a current day on top of a previous day and get written into current day master file. For records that did not receive updates from current delta, these records may remain unchanged and then copied over to current day master file. The process may then drop records that were purged from SOR and not get written into a current day master file.

Figure 3:
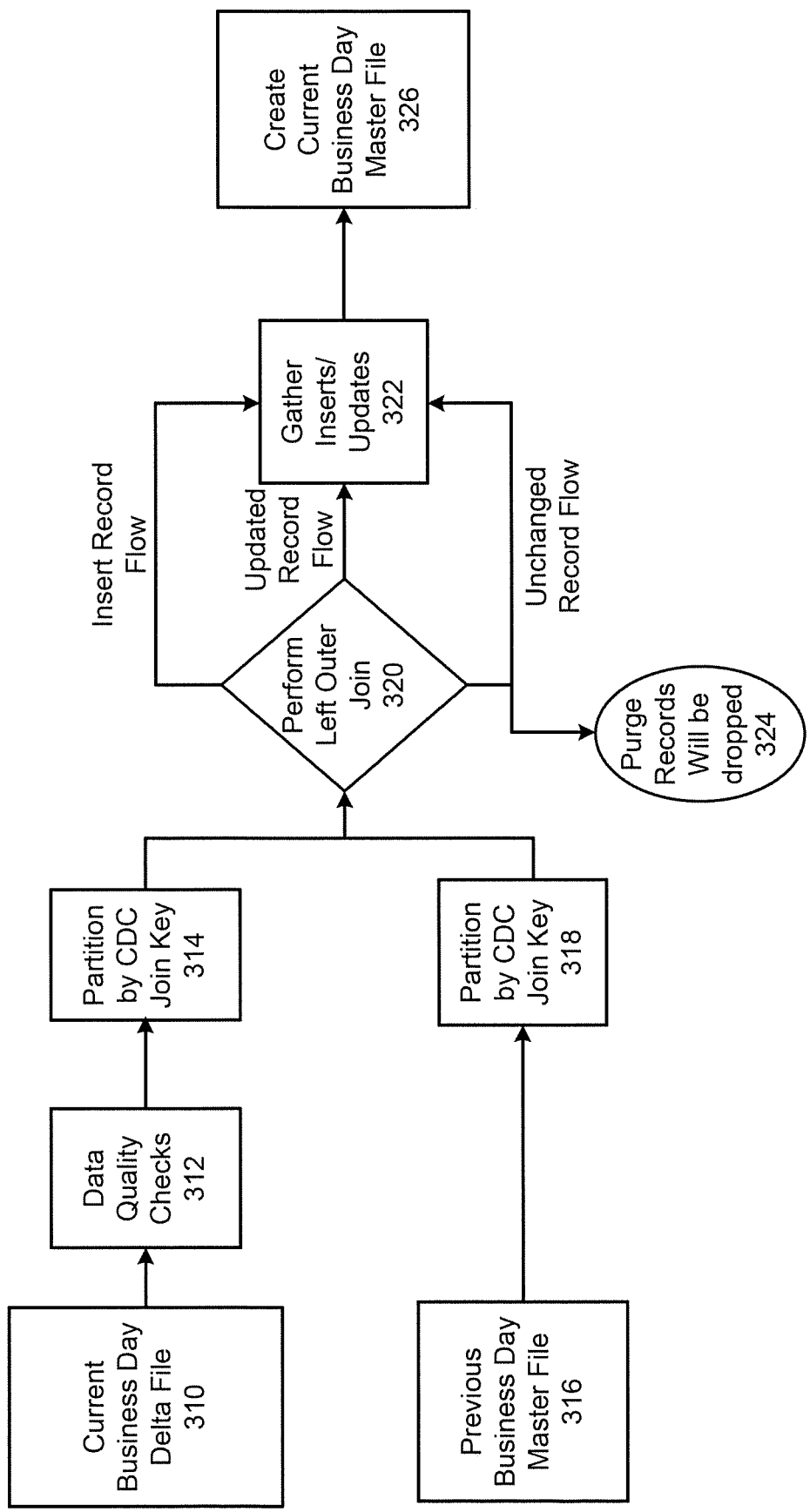
FIG. 3 is an exemplary flow diagram that illustrates an optimal Hadoop change data capture CDC process, according to an embodiment of the present invention.

FIG. 3 is an exemplary flow diagram that illustrates an optimal Hadoop change data capture CDC process, according to an embodiment of the present invention. At step 310, a current business day delta file, e.g., LOAN, Date: Aug. 31, 2016, may be received. At step 312, data quality checks may be performed. At step 314, the system may partition by CDC Join Key. A Join Key may represent a value used to link rows between tables or a common column. For example, it may be a single or a composite column used to link between files/tables. At step 316, previous business day master file, e.g., LOAN_R (Master Entity), Date: Aug. 30, 2016, may be received. At step 318, the system may partition by the CDC Join Key. At step 320, the system may perform an operation, such as a Left Outer Join, between the delta file and master file. A Left Outer Join operation may represent a Join operation that enables a user to specify a join clause. The Left Outer Join preserves the unmatched data (e.g., rows) from the first (left) data (e.g., table), joining them with a NULL row in the shape of the second (right) data (e.g., table). For example, the Left Outer Join operation may return records from a left table and the matched records from the right table. The result is NULL from the right side, if there is no match.

The system may insert a record, update a record, purge records, etc. At step 322, inserts and updates may be gathered. At step 326, current business day master file, e.g., LOAN_R (Master Entity), Date: Aug. 31, 2016 may be created. According to an embodiment of the present invention, steps 312, 314, 318, 320, 322 and 324 may represent processing points of forced high parallelism. Steps 310, 316 and 326 may be processed using default Hadoop parallelism.

Processing points at steps 312, 314, 318, 320, 322 and 324 may be performed under a large layout, which forces parallelism on an increased number of Hadoop data nodes as opposed to default Hadoop parallelism based on file size. For example, Parameter CAIP_HDFS_HOST_LAYOUT_LARGE may be used to force high parallelism on Hadoop data nodes. This exemplary parameter resolves to a multiple data nodes regardless of Hadoop file size, resulting in parallelism at specific processing points. This is illustrated in FIG. 5, described below. CDC Join key (e.g.: LOAN_NUMBER) may perform partitioning across Hadoop data nodes. Left Outer Join between current day delta and previous day master may identify inserts, updates, purges and unchanged. Output of join may be gathered before writing into current day master file. Purge records may be dropped from previous day master file and not be written into a current day master file.

The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

Figure 4:
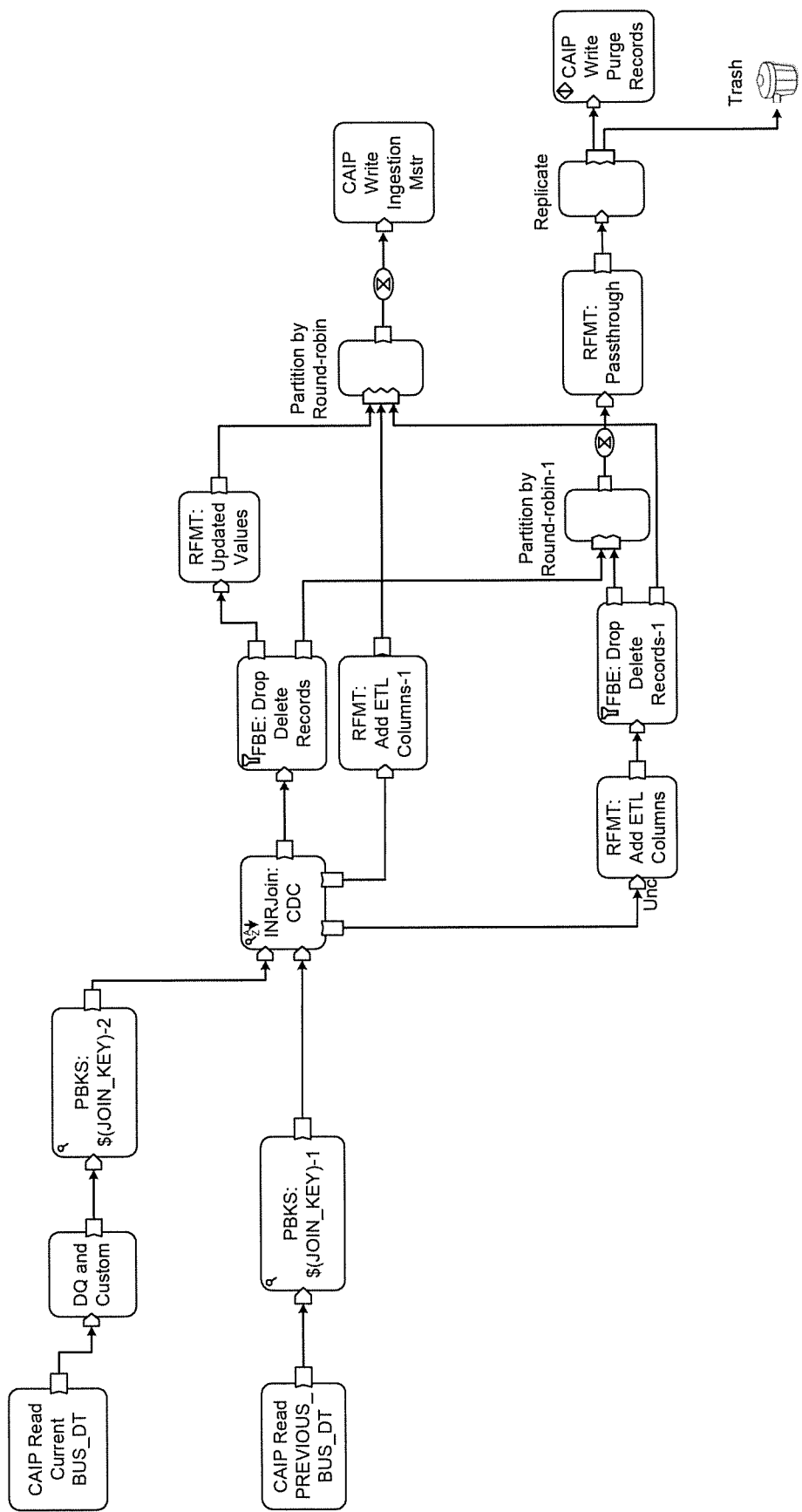
FIG. 4 is an exemplary screenshot of code, according to an embodiment of the present invention.

FIG. 4 is an exemplary screenshot of code, according to an embodiment of the present invention. In this example, a forced parallelism parameter may be represented as $CAIP_HDFS_HOST_LAYOUT_LARGE. This parameter may demonstrate forced parallelism using all Hadoop data nodes in this specific environment. This diagram provides a screenshot of ETL Ab-initio process designed as explained in FIG. 3. Other processing applications may be used in accordance with the various embodiments of the present invention.

FIGS. 5 and 6 illustrates exemplary screenshots, according to an embodiment of the present invention. FIGS. 5 and 6 show a default Hadoop parallelism nodes for read/write operations. FIG. 5 shows 67 nodes being used for forced high parallelism and FIG. 6 shows 10 exemplary nodes, out of 67 total, are being used by default Hadoop parallelism based on file size. FIG. 5 illustrates usage of an optimal number of Hadoop data nodes through forced parallelism, to perform critical steps in CDC process. FIG. 6 illustrates only specific nodes being defaulted by Hadoop process for writing the target file, based on file size. As shown in FIG. 6, an embodiment of the present invention may be integrated with Ab-initio software. Other high-volume data processing applications may be implemented in accordance with the various embodiments of the present invention.

According to an exemplary application, data may be manipulated, confirmed and further integrated across multiple systems of records (SORs). In this example, a SOR may provide access to an account; another SOR may provide information relating to transactions that are occurring on the account and yet another SOR may address delinquent accounts and provide support to develop a payment plan for the customer. Accordingly, multiple (and disparate) applications are sending different pieces of information for a particular account or user. Upon obtaining a full snapshot which may be generated based on CDC files, as described herein, the aggregated data may be analyzed, processed, manipulated and/or otherwise transformed through the data manipulation language, as described in U.S. Ser. No. 16/148,052 and U.S. Provisional Application 62/565,543, the contents of which are incorporated by reference herein in their entirety.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that processes optimal change data capture on a Hadoop cluster of data nodes, the system comprising:
an application component that receives change data;
a memory component that stores change data; and
a computer server coupled to the application component and the memory, the computer server comprising a programmed computer hardware processor configured to perform the steps of:
receiving a change data capture file containing specific records of changes for a current time period with respect to the application component;
receiving a previous full data snapshot file for a time period prior to the current time period;
execute a quality check process for each of a plurality of attributes on the change data capture file by forced parallelism that utilizes more Hadoop data nodes than a default number of Hadoop data nodes for the size of the change data capture file;
performing a join operation between the change data capture file and the previous full data snapshot to create a full data snapshot file for the current time period, wherein the join operation is performed under a large layout, which forces parallelism on an increased number of Hadoop data nodes greater than the default number of Hadoop data nodes for the size of the change data capture file; and writing the full data snapshot for the current time period to the memory component.

2. The system of claim 1, wherein the full set of Hadoop data nodes comprises all available Hadoop data nodes.

3. The system of claim 1, wherein the change data capture file comprises a plurality of processes.

4. The system of claim 3, wherein the plurality of processes comprises: Insert, Update, Unchange and Purge.

5. The system of claim 1, wherein applying change data capture records comprises performing a left outer join operation between the change data capture file and the previous full data snapshot file.

6. The system of claim 1, wherein applying change data capture records comprises identifying insert records, update records and unchanged records.

7. The system of claim 6, wherein the unchanged records are purged.

8. The system of claim 6, wherein the insert records and update records are applied using a forced parallelism configuration that applies processing on a full set of Hadoop data nodes.

9. The system of claim 1, wherein the change data capture file is partitioned across the full set of Hadoop data nodes.

10. A method that processes optimal change data capture on a Hadoop cluster of data nodes, the method comprising the steps of:

receiving a change data capture file containing specific records of changes for a current time period with respect to an application component;

receiving a previous full data snapshot file for a time period prior to the current time period;

execute a quality check process for each of a plurality of attributes on the change data capture file by forced parallelism that utilizes more Hadoop data nodes than a default number of Hadoop data nodes for the size of the change data capture file;

performing a join operation between the change data capture file and the previous full data snapshot to create a full data snapshot file for the current time period, wherein the join operation is performed under a large layout, which forces parallelism on an increased number of Hadoop data nodes greater than the default number of Hadoop data nodes for the size of the change data capture file; and writing the full data snapshot for the current time period to the memory component.

11. The method of claim 10, wherein the full set of Hadoop data nodes comprises all available Hadoop data nodes.

12. The method of claim 10, wherein the change data capture file comprises a plurality of processes.

13. The method of claim 12, wherein the plurality of processes comprises: Insert, Update, Unchange and Purge.

14. The method of claim 10, wherein applying change data capture records comprises performing a left outer join operation between the change data capture file and the previous full data snapshot file.

15. The method of claim 10, wherein applying change data capture records comprises identifying insert records, update records and unchanged records.

16. The method of claim 15, wherein the unchanged records are purged.

17. The method of claim 15, wherein the insert records and update records are applied using a forced parallelism configuration that applies processing on a full set of Hadoop data nodes.

18. The method of claim 10, wherein the change data capture file is partitioned across the full set of Hadoop data nodes.

* * * * *